United States Patent

[11] 3,596,613

| [72] | Inventors | Ernest J. Roth<br>Ridgewood, N.J.;<br>Frank D. Chipchase, New York, N.Y. |
|---|---|---|
| [21] | Appl. No. | 779,691 |
| [22] | Filed | Nov. 29, 1968 |
| [45] | Patented | Aug. 3, 1971 |
| [73] | Assignee | International Multifoods Corporation<br>Minneapolis, Minn. |

[54] AUTOMATIC MACHINE FOR CUTTING AND DEPOSITING DOUGH INTO PANS
23 Claims, 11 Drawing Figs.

[52] U.S. Cl. .................................................. 107/4,
107/.27
[51] Int. Cl. ............................................... A21c 5/00
[50] Field of Search .......................................... 107/1, 1.4,
4.2, 4, 4.4, 4.3, 7.2, 7.4, 9.1, 14.1, 14.3, 14.5, 15.1,
15.2, 27, 54.2, 68, 69, 57; 198/34, 76

[56] References Cited
UNITED STATES PATENTS

| 1,707,477 | 4/1929 | Hungerford | 107/7 (.4) |
|---|---|---|---|
| 1,988,744 | 1/1935 | Marresford | 107/7 (.2) |
| 2,728,508 | 12/1955 | Marasso | 107/7 (.2) X |
| 3,196,810 | 7/1965 | Roth | 107/7 (.2) X |

*Primary Examiner*—Edward L. Roberts
*Attorney*—Merchant & Gould

ABSTRACT: Raw dough is formed in a sheet. The sheet may be cut and separated into webs and curled into rolls. Alternatively, the single sheet may be fed to the automatic machine. The rolls are simultaneously cut into gobs which fall into pans. Alternatively, the sheet is cut into distinct single gobs one of which falls into each pan. The pans are moved in synchronization along a conveyor with the action of the cutting blades so that a row of gobs or a single cut sheet is provided in each pan. The pans are automatically dispensed from a hopper and moved into position wherein they will receive the cut raw dough.

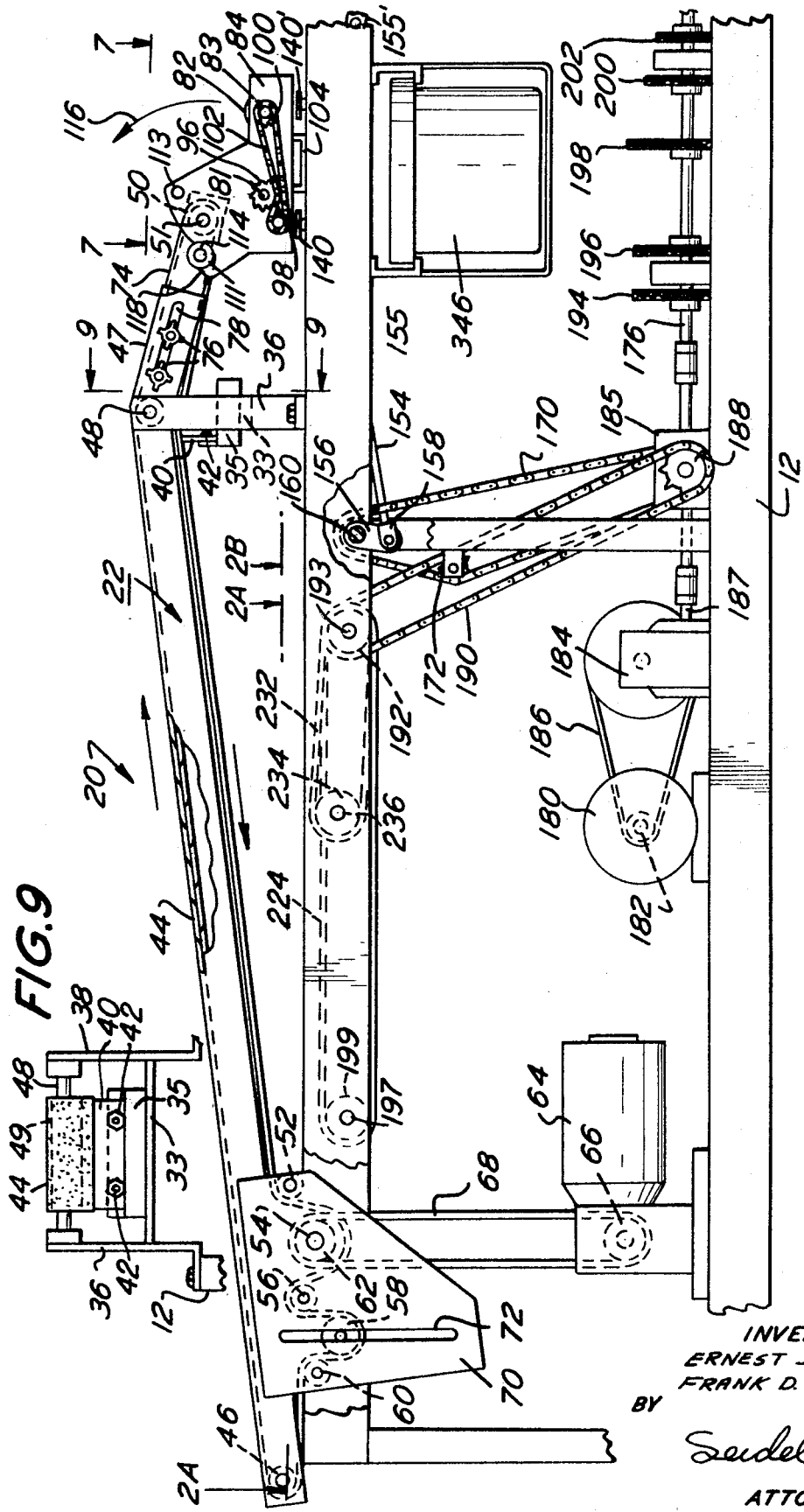

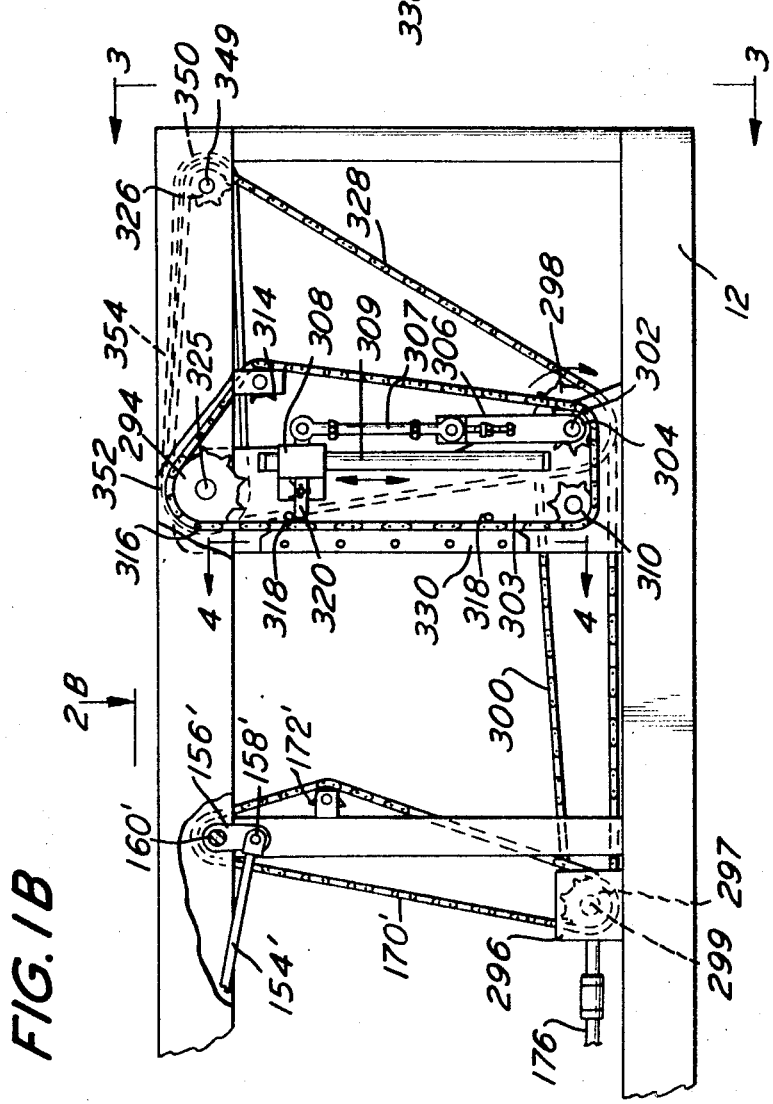

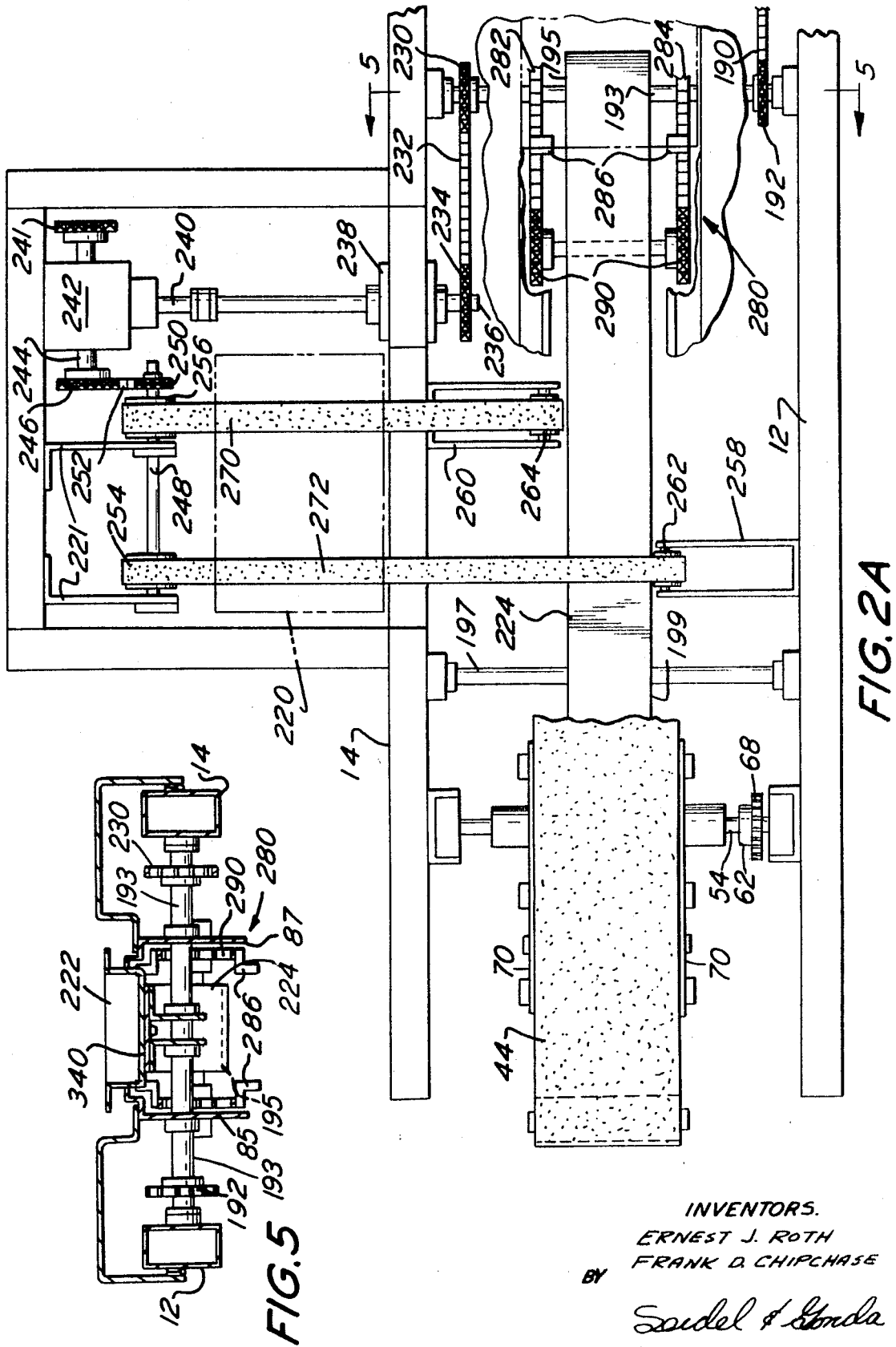

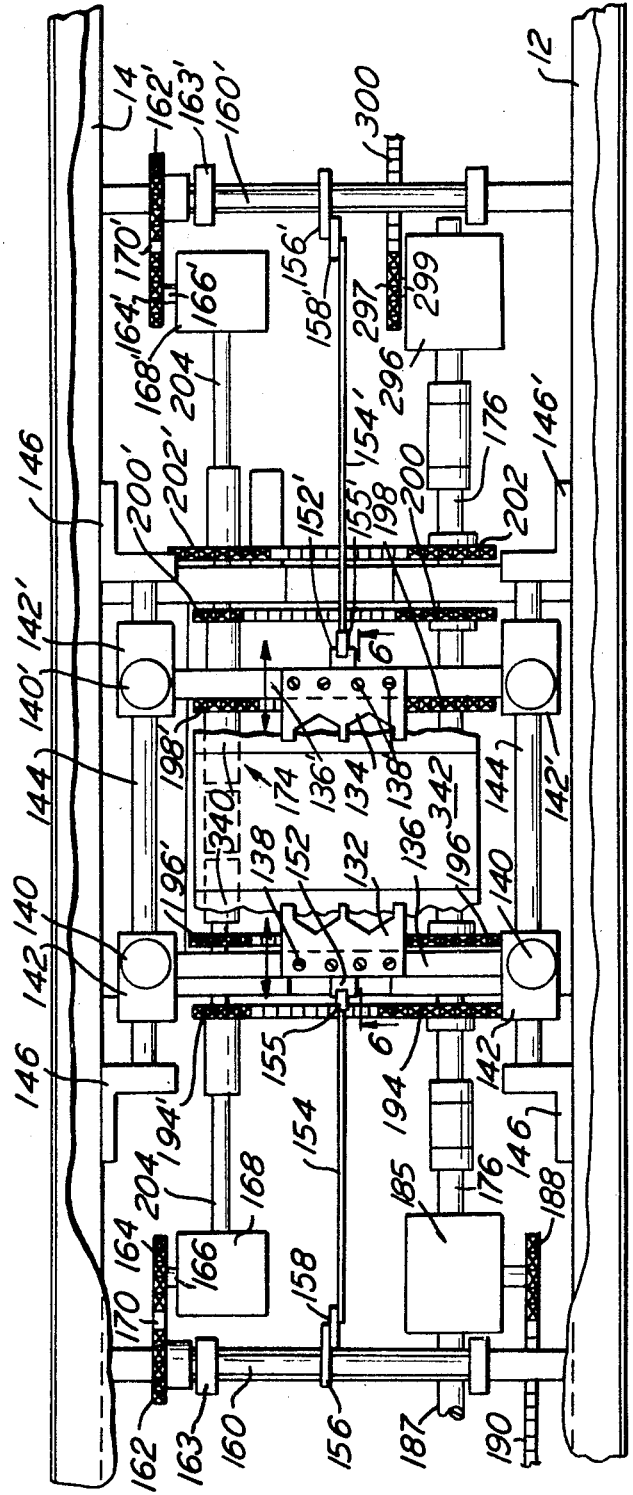

INVENTORS.
ERNEST J. ROTH
FRANK D. CHIPCHASE
BY Seidel & Gonda
ATTORNEYS.

and 2A.

AUTOMATIC MACHINE FOR CUTTING AND DEPOSITING DOUGH INTO PANS

The present invention relates to automatic machinery for cutting and depositing raw dough into pans and more particularly to a machine which functions automatically and continuously to cut and deposit gobs of raw dough into pans.

The pans are automatically dispensed from a hopper and are fed to a pan conveyor which continuously feeds the pans in synchronization with the operation of the continuously cutting knives. All of the operations of the machine of the present invention are automatic and most of the operations performed by the machine are subject to adjustment so as to take into consideration different types of dough, different size pans, different number of cuts per pan, etc.

It is an object of the present invention to provide a novel machine which will automatically cut raw webs into gobs, which gobs fall into pans moving in synchronization with the cutting action.

It is another object of the present invention to provide an automatic machine for cutting gobs of raw dough and depositing the same into pans fed from a hopper.

It is another object of the present invention to provide an automatic machine which is readily adaptable to cut rolls of raw dough into gobs or to cut a single sheet of material into gobs.

It is a further object of the present invention to provide an automatic machine having a pan conveyor advance mechanism which is readily adapted to modify the speed of pans depending upon the number of cuts of raw dough to be deposited into each pan.

It is still a further object of the present invention to provide an automatic machine which will function substantially completely automatically and require little maintenance and supervision.

Other objects will appear hereinafter.

For the purpose of illustrating the invention there is shown in the drawings a form which is presently preferred; it being understood, however, that this invention is not limited to the precise arrangements and instrumentalities shown.

FIG. 1A and FIG. 1B are side elevation views, broken away in part of the automatic machine of the present invention;

FIG. 2A and FIG. 2B are top plan views taken along lines 2A—2A and 2B—2B of FIGS. 1A and 1B;

FIG. 4 is a section view taken along line 4—4 of FIG. 1B;

FIG. 5 is a section view taken along line 5—5 of FIG. 2A;

FIG. 6 is a section view taken along line 6—6 of FIG. 2B;

FIG. 9 is a section view taken along line 9—9 of FIG. 1A.

Figure 3:
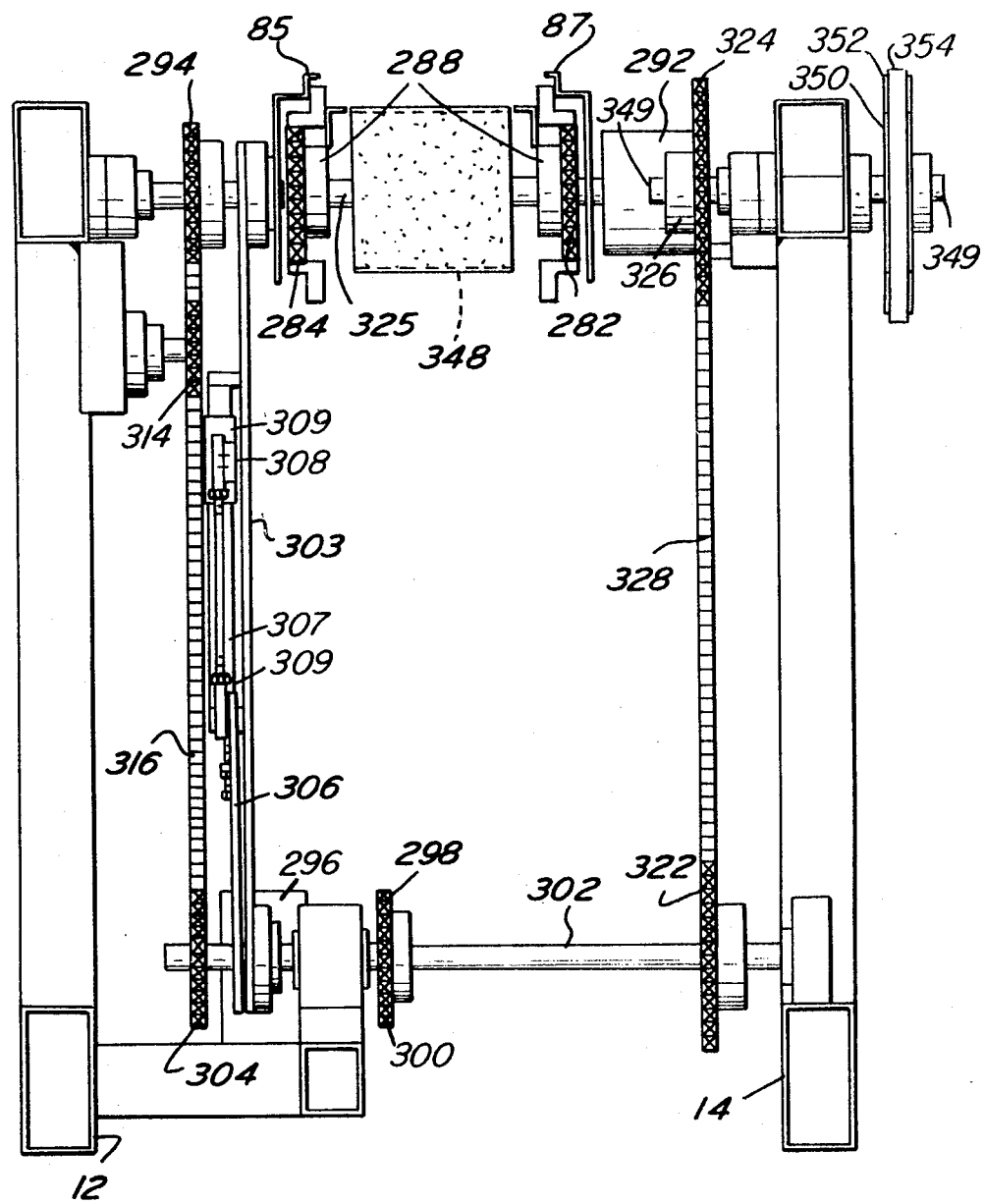
FIG. 3 is an end view taken along line 3—3 of FIG. 1B.

Referring now to the drawings in detail, wherein like numerals indicate like structure throughout the several views, there is shown in FIGS. 1—8 an automatic machine for cutting and depositing dough into pans, generally designated by the reference numeral 10.

THE MACHINE

FIGS. 1A and 1B show a side elevation view embodying the machine of the instant invention. The machine has a boxlike frame structure consisting of spaced rectangular side frames 12 and 14. The side frames 12 and 14 are interconnected by various spaced supporting rails. The frames 12 and 14 are also interconnected by various sprocket supporting shafts to be described hereinafter.

THE DOUGH CONVEYOR

Referring now particularly to FIGS. 1A, 2A, 7 and 8, there is disclosed therein a raw dough conveyor generally indicated by the reference numeral 20. The dough conveyor has raw dough delivered to the left end thereof as viewed in FIGS. 1A and 2A.

The conveyor is provided with a conveyor frame 22 supported by side frames 12 and 14.

L-shaped trapdoor 36 and 38 are secured to the ends of a fixed shaft 48. L-shaped supports members 36 and 38 are secured at their other ends to the frames 12 and 14. A cross support bar 33 extends between members 36 and 38. A pan 35 provided for scrapings is supported by bar 33. A doctor bar 40 is secured to the pan 35 by bolts 42. The doctor bar 40 scrapes endless conveyor 44 causing foreign matter to be deposited in the pan 35 and prevents any foreign matter from accumulating on the belt.

Endless conveyor belt 44 receives raw dough and delivers it to the cutting zone. The belt 44 travels around or is guided by rollers 46, 49, 50, 52, 54, 56, 58 and 60. Roller 50 is supported on and keyed to shaft 51. Roller 54 has a sprocket 62 at one end thereof. A conveyor drive motor 64 drives a sprocket 66 secured thereto. A drive chain 68 interconnects sprockets 62 and 66 and thereby supplies the drive for the belt 44.

A plate 70 is secured to frame 12. The plate 70 may be bolted to and provide support for the left-hand end of the conveyor frame 22. The plate 70 has an elongated slot 72 therein. The roller 58 is a floating or live roller which automatically provides the desired tension on the belt 44 and permits slack in the belt to be eliminated and is provided for a purpose to be described hereinafter.

The roller 46 is freely rotatable and is journaled in the conveyor frame 22 therefor. The rollers 52, 56 and 60 are freely rotatable and are supported by the plate 70. The shaft 48 is stationary and supports conveyor frame 22 therefor. The shaft 48 has a freely rotating pivot pulley 49 thereon.

The conveyor frame 22 includes a second conveyor frame therefor extension 74 which is telescopically received in frame 22. Extension 74 is similar in appearance to frame 22. The driven roller 50 has its ends journaled in the sideplates of the extension 74.

Locking bolts 76 extend through a slot 78 in the opposite of extension 74 and are adapted to lock the extension 74 in its desired position. Similar locking bolts may extend through the opposite side of extension 74. Any other conventional mechanical locking means can be used for locking the extension 74 in its desired position. The purpose and function of extension 74 will be made clear hereinafter.

The portion 47 of the dough conveyor 20 beyond the shaft 48 may be rotated about shaft 48 in a counterclockwise direction as viewed in FIG. 1A to an inoperative position. Movement of the portion 47 and the structure supported thereby to an inoperative position permits free access to the cutting zone of the machine.

GUIDE ROLLERS

Driven lucite guide rollers 80 and 82 are supported adjacent to the right end of the conveyor 20 and are adapted to guide rolls of raw dough into the cutting zone. The rollers 80 and 82 are driven to insure positive feed of the rolls of raw dough into the cutting zone and prevent undesirable movement of the rolls while they are being cut. The rollers 80 and 82 are keyed to shafts 81 and 83, respectively.

The rollers 80 and 82 are supported by sideplates 84 and 86. The sideplates and rollers are adapted to be pivoted to an inoperative position when a single sheet of raw dough rather than rolls of raw dough is fed to the cutting zone.

Figure 8:
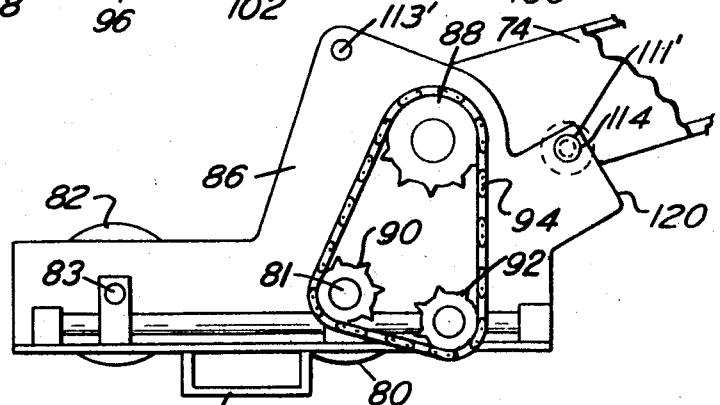
FIG. 8 is a side elevation view of the mechanism of FIG. 7 taken along line 8—8 of FIG. 7.

The shaft 51 supporting driven roller 50 has a sprocket 88 on one end thereof (See FIG. 8). Shaft 82 has a sprocket 90 secured to one end thereof. An idler sprocket 92 is secured to the sideplate 86. A chain 94 extends around sprockets 88, 90 and 92 and provides a positive drive for the roller 80.

The other end of shaft 81 has a sprocket 96 secured thereto. An idler sprocket 98 is attached to the sideplate 84. A sprocket 100 is secured to shaft 83. A chain 102 interconnects the sprockets 96, 98 and 100 and serves to drive the lucite roller 82. Hence, the rollers 80 and 82 rotate in opposite directions and serve to feed the rolls of raw dough into the cutting zone.

Figure 7:
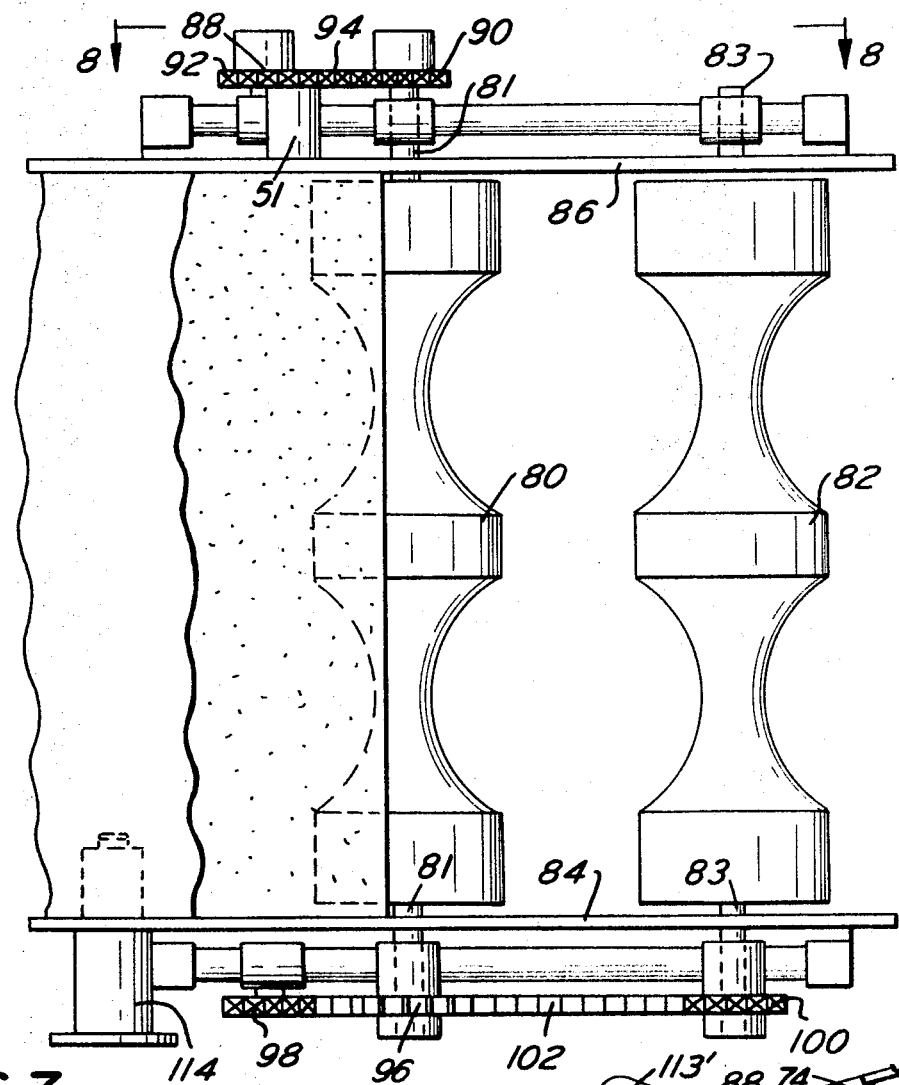
FIG. 7 is a top plan view of the guide mechanism for the raw dough rolls utilized in the present invention taken along line 7—7 of FIG. 1A.

The configuration of the rollers 80 and 82 is such that they conform to the shape of the rolls of raw dough. The shape of the rollers is shown in FIG. 7. The conveyor belt will feed the rolls of raw dough to the rollers 80 and 82 so that the rolls are received within the circular openings defined by the surface of the rollers 80 and 82. Support brackets 104 of FIG. 1A and 106 of FIG. 8 are welded or otherwise secured to plates 84 and 86, respectively. The support brackets will rest upon the sheet metal pan guides 85 and 86 (FIG. 3), respectively, when the rollers 80 and 82 are in their operative position.

When a single sheet of raw dough is to be fed through the cutting zone, the entire guide roller assembly must be pivoted about shaft 51 out of the path of movement of the single sheet. To enable such movement, sideplate 84 includes a pair of indexing holes 111 and 113 which are disposed in alignment with indexing holes 111' and 113', respectively, in sideplate 86. All of the holes 111, 111', 113, 113' are equidistantly spaced with respect to shaft 51 and are therefore alignable through swinging movement of the guide roller assembly (see arm 116 in FIG. 1A) with a pair of aligned holes (not shown) formed in extension 74. The insertion of a locater pin 114 through a selected pair of indexing holes and the alignment holes in extension 74 permits the guide roller assembly to be retained in either the operative or inoperative position.

The locating pin 108 has locater holes 110 and 112 in its ends which are adapted to receive locating pins 114.

The sideplate 84 has indexing holes 111 and 113 therein. The sideplate 86 has indexing holes 111' and 113' therein which are in alignment with holes 111 and 113, respectively. Locating pins 114 are adapted to pass through either locater holes 111 and 111' or locater holes 113 and 113' in order to lock the guide roller assembly in their desired position. As can be seen in FIG. 1A, a locater pin 114 passes through indexing hole 111 and seats in locater hole 110 to lock the guide rollers into operative position wherein the rolls of raw dough are adapted to pass between the guide rollers 80 and 82 in locater hole 112. Adjustable journals may be provided for the shafts 81 and 83 so that different diameter dough rolls may be accommodated by the rollers 80 and 82.

The guide rollers and sideplates 84 and 86 are adapted to pivot about shaft 51. Accordingly, when it is desired to move the guide rollers into their inoperative position, locating pins 114 are removed from the locater holes 110 and 112 in locating roll 108 and sideplates 84 and 96 and the structure secured thereto and supported thereby are rotated in the direction of arrow 116 shown in FIG. 1A to move the rollers 80 and 82 to their inoperative position. Locater pins 114 will then be inserted through indexing holes 113 and 113' and seat in locater holes 110 and 112 to lock the rollers in this position.

The sideplate 84 is provided with a flat surface 118 and sideplate 86 is provided with a flat surface 120. The flat surfaces 118 and 120 will rest upon the guides 85 and 87, respectively, when the rollers 80 and 82 are moved to their inoperative position.

After the rollers have been moved to their inoperative position, the extension 74 will be extended so that the single sheet of raw dough will exit from the conveyor immediately above the cutting zone. As noted above, the roller 58 will have the vertical position thereof automatically changed to accommodate changes in length of the conveyor belt 44 and hence permit the extension of the conveyor to a position immediately above the cutting zone.

THE CUTTING ZONE

Referring now to FIGS. 2B and 6, the exit end of the conveyor 20 is adjacent a cutting zone 130. Cutting blades 132 and 134 are provided at the cutting zone 130. The cutting blade 132 and the structure supporting the same is substantially identical to cutting blade 134 and its supporting structure except as will appear hereinafter. Accordingly, only cutting blade 132 will be discussed in detail. Like structure associated with cutting blade 134 will be indicated with a prime notation of the same reference numeral.

Cutting blade 132 is secured to a crossbar 136 by means of bolts or other suitable securing means 138. The bar 136 is secured to lineal ball bearings 142 which are adapted to be reciprocated along shafts 144. The shafts 144 are located adjacent the ends of the crossbar 136. Locking screws 140 are provided to lock the crossbar 136 to the lineal ball bearings 142. The locking screws 140 are adapted to pass through brackets 141 secured to the lineal ball bearings 142 and hence securely lock the crossbar 136 in its desired position. The shafts 144 are supported by L-shaped brackets 146 which are secured to the side frames 12 and 14.

Referring now particularly to FIGS. 1A, 1B, 2B and 6, blocks 148 are welded such as at 150 to the underside of the lineal ball bearings 142. Each block 148 has a clevis 152 integral therewith approximately midway between the ends thereof. The structure adjacent to side frame 12 will be described in detail. Identical structure is provided adjacent frame 14. Connecting line 154 has a projecting lug 155 at one end thereof which is connected to the clevis 152. At its other end the link 154 is connected to the crank 156 by means of a projecting lug 158. The crank 156 is keyed to the shaft 160 and rotates therewith. Rotation of the shaft 160 will cause reciprocation of the block 148 and the lineal ball bearings 142 along the shafts 144. Reciprocation of the lineal bearings 142 will in turn cause reciprocation of the knife blades 132 and 134 in the direction of the arrows shown in FIG. 6.

The shaft 160 has a sprocket 162 secured thereto through a conventional override device 163. A gearbox 168 is supported adjacent the base of the machine. The gearbox 168 causes rotation of a shaft 166 extending therefrom which has a sprocket 164 mounted thereon. A chain 170 extends around the sprockets 162, 164 and an idler sprocket 172. Rotation of the shaft 166 will cause rotation of the sprocket 162, shaft 160 and crank arm 156. The speed of rotation of the shaft 166 is determined by the input to the gearbox 168. An identical gearbox 168' drives the crank arm 156' which in turn causes reciprocation of the knife blade 134. Identical connecting mechanisms are provided adjacent frame 14 and operated by rotation of shafts 160 and 160' (See FIG. 2B).

The override devices 163 and 163' provide an important safety feature. Hence, should cutting blades 132 and 134 meet resistance greater than that occasioned by the dough rolls, the override devices will permit the blades to remain in an open position. In addition, a sheet metal hood or cover may be placed over the cutting zone when the machine is operative.

A plurality of clutches generally indicated by reference numeral 174 (FIG. 2B) is provided to vary the speed of rotation of the shafts 166 and 166'. The shaft 204 provides the input for gearboxes 168 and 168' which is dependent upon the desired speed of operation of the cutting blades.

The main drive motor 180 has a V-belt variable pitch sheave 182 on one end thereof and is drivingly connected to a speed reducer 184 by means of an endless V-belt 186. The shaft 187 emanating from the speed reducer 184 provides the input for the gearbox 185. The gearbox 185 has a sprocket 188 driven thereby. The sprocket 188 is driven at a constant predetermined speed and has an endless chain 190 adapted to transmit motion to a sprocket 192 for a purpose which will be discussed hereinafter.

The shaft 176 is driven by the gearbox 185 at a constant predetermined speed and causes rotation of pinions 194, 196, 198, 200 and 202. The pinions 194, 196, 198, 200 and 202 have drive chains associated therewith which engages pinions having corresponding primed reference numerals on shaft 204. Shaft 204 is parallel to and spaced from shaft 176.

Shaft 204 has the plurality of clutches 174 associated therewith and the speed of rotation of the shaft 204 is dependent upon which of the clutches is operative. Alternatively, a clutch may be utilized to cause the shaft 204 to be driven by any of the pinions 194, 196, 198, 200 and 202. The pinions are of different sizes and accordingly, will cause varying speeds of rotation of the shaft 204.

The shaft 204 drives gearboxes 168 and 168'. The gearboxes cause reciprocation of the cutting blades will be determined by which clutch and hence which of the pinions 194, 196, 198, 200 and 202 drives shaft 204. Suitable conventional interlock means means may be provided for permitting only one of the clutches to be engaged at any given time on the shaft 204. Accordingly, the speed of the knife blades can be varied so that the cuts per pan of raw dough may be varied. The slowest speed of the blades will be described wherein only a single cut per pan is required. The speed of the cutting blades will be increased as the number of cuts per pan increases.

THE PAN CONVEYOR

A hopper 220 for discharging open top pans 222 is provided. Per se, hopper 220 is conventional and commercially available. Discharge of open top pans 222 from hopper 220 is controlled by conventional means. Sprocket 192 is mounted on shaft 193. A friction drive roller 195 is secured to shaft 193. A shaft 197 has its ends journaled in frames 12 and 14. Shaft 197 is freely rotatable and has a friction roller 199 secured thereto. An endless intermediate pan conveyor belt 224 extends around friction rollers 195 and 199 and is driven by friction drive roll 195.

The shaft 193 has a sprocket 230 secured thereto and adapted to rotate therewith. The sprocket 230 has an endless chain 232 therearound which extends around a sprocket 234 mounted on a shaft 236. The shaft 236 extends into a gearbox 238 and drives shaft 240. Shaft 240 extends into a gearbox 242 which drives shaft 244. Shaft 244 has a sprocket 246 thereon.

The pan conveyor mechanism has a shaft 248 having the ends thereof journaled for rotation in the frame 221 which supports the pans to be dispensed. The shaft 248 has a sprocket 250 on one end thereof. A chain 252 interconnects sprockets 246 and 250. Accordingly, the shaft 248 is rotated at a constant predetermined speed. The shaft 248 has friction rollers 254 and 256 mounted thereon and adapted to rotate therewith. U-shaped frame members 258 and 260 are secured to the frames 12 and 14, respectively. The U-shaped members 258 and 260 have friction rollers 262 and 264 supported in the bight of the U. A friction belt 270 extends around friction rollers 256 and 264. A friction belt 272 extends around friction rollers 254 and 262. The belts are adapted to engage the bottom pan in the pan dispenser 220 and move the same to the intermediate pan conveyor belt 224. The pan conveyor belt 224 delivers the pans 222 to the main pan conveyor 280. The conveyor 224 is at a right angle with respect to the conveyor 280.

Discharge of open top pans 222 from hopper 220 is controlled by sprocket 241 which insures synchronization with the machine. The pans 222 are discharged sequentially and are fed to the intermediate pan conveyor 224 and thereafter to the main pan conveyor 280.

The speed of the main pan conveyor 280 is synchronized with the speed of operation of the cutting blades. The main pan conveyor 280 is disposed at a right angle to the friction belts 270 and 272 and in line with the intermediate conveyor 224.

Conveyor 280 may be similar to the type shown in U.S. Pat. No. 3,196,810. Conveyor 280 includes a pair of endless belts or chains 282 and 284 having transversely extending pairs of pushers 286 at spaced points therealong. Each pair of pushers 186 extend inwardly toward each other and are adapted to engage and push an open top pan 222.

Chains 282 and 284 extend around driven sprockets 288 and idler sprockets 290. Driven sprockets 288 are provided with two sources of drive. One source is through a conventional overrunning clutch 292. The other source of drive is through the advance sprocket 294.

In the preferred embodiment the advance sprocket 294 and the driven sprockets 288 have 24 teeth thereon and are substantially identical. One complete revolution of the advance sprocket 294 and driven sprockets 288 represents one complete pan movement.

Shaft 176 drives gearbox 296 as shown in FIG. 1B of the drawings. Gearbox 296 drives a sprocket 297 which is fixedly secured to a shaft 299 emanating from gearbox 296. A sprocket 298 is fixed to a shaft 302 which shaft is suitably journaled in side frame 14 and a support plate 303 (FIG. 3). An endless chain 300 interconnects the sprockets 297 and 298 and drives the shaft 302 at a predetermined rate of speed.

An idler sprocket 304 is supported on shaft 302 adjacent to crank arm 306. Crank arm 306 is fixed to shaft 302 and is adapted to rotate therewith. The crank arm 306 is adapted to reciprocate a slider 308. The slider 308 is connected to the crank arm through a link 307 and is adapted to be reciprocated along a member 309 supported by plate 303. An idler sprocket 310 is supported by the plate 303 and is in vertical alignment with advance sprocket 294. An idler sprocket 314 is supported from the frame 12. An endless chain 316 is adapted to extend around sprockets 294, 314, 304 and 310 to interconnect the same. The endless chain 316 will hereinafter be referred to as the advance chain circuit. The advance chain 316 has projecting attachments 318 thereon for a purpose which will appear hereinafter.

A slider 308 has a projecting finger 320 spring biased to a position where it will engage an attachment 318 as the slider 308 moves in an upward direction along member 309. Suitable spring means is provided to permit the finger 320 to be pivoted into an inoperative position by the projecting chain attachments 318 as the finger 320 contacts the attachments during downward movement along the member 309. The spring means will return the finger to its operative position as soon as the attachment 318 passes beyond the finger.

A sprocket 322 is mounted at the other end of the shaft 302. A sprocket 324 is mounted on overrunning clutch 292. The shaft 325 drives through the overrunning clutch 292 to drive the driven sprockets 288 and the advance sprocket 294. A sprocket 326 is supported by the side frame 14 and shaft 349 and drives belt pulley 348 as will be explained hereinafter in detail. An endless chain 328 interconnects the sprockets 322, 324 and 326 to effect rotation of the shaft 325. Sprocket 324 has a greater number of teeth than sprocket 322. Accordingly, shaft 325 is rotated at a slower speed than shaft 302. The advance sprocket 294 drives the endless chain 316. The crank arm 306 is driven by shaft 302.

As shown in FIG. 4, a plate 330 is spaced from the plate 303 by a plurality of support spacers 332. The support spacers 332 provide a backup support for the advance chain 316.

In order to appreciate the manner in which the main pan conveyor 280 is advanced, a specific example will be discussed. In the example, it will be assumed that the blades 132 and 134 are operated at a speed to provide 12 gobs of raw dough in each pan. The latter condition assumes that two gobs are provided upon each reciprocation of the blades and that six cuts are required. Twelve gobs per pan will normally be the maximum quantity of gobs to be placed in a pan.

Hence, when six cuts per pan are desired, for five-sixths six cuts, five spaces per pan of the time required for one complete pan movement, the sprockets 294 and 288 which are 24-tooth sprockets will be driven at a rate of speed equivalent to 3.4 pitches per cut. In the particular embodiment being discussed, one pitch represents approximately one-half inch. A movement of 3.4 pitches will result in a movement of 1.7 inches. The movement of 1.7 inches is the distance between the center of gobs in the pan 222. The movement of 1.7 inches is arrived at by determining the length of the pan 222 and the number of gobs to be deposited therein. Therefore, in five-sixths of the time, the sprockets 294 and 288 will move 17 pitches. Within such five-sixths of the time, 12 gobs, six cuts, five spaces will be deposited into open top pan 222 and the pan will have moved a total of five spaces or 8½ inches.

The distance that must be traversed in order to move from one pan to the next pan is a larger distance compared to that which is necessary to go from one gob drop to the next gob drop within a pan. Accordingly, since the knife blades are reciprocating at a constant rate, the pan conveyor must be moved through a greater distance in the same period of time (one-sixth of time or one space).

The distance between pans in the specific example given represents seven pitches on sprockets 294 and 288. This is the distance between the center of the last gobs to be dropped in one pan to the center of the first gobs to be dropped in the succeeding pan. Therefore, these sprockets must be moved seven pitches within one-sixth of the time as compared to 3.4 pitches for one-sixth of the time (one cut). The seven pitches represent a 60° angle movement of the crank arm 306. The main source of drive is through shaft 302, sprocket 322, drive chain 328, sprocket 324, overrunning clutch 292, and shaft 325 to drive the driven sprockets 288. Advance sprocket 294 and chain 316 are also driven through shaft 325 and are driven at the speed which will cause the driven sprockets 288 to move at the slow rate of 3.4 pitches per cut.

The advance chain circuit 316 has the projecting chain attachments 318 spaced therealong exactly the same distance as the pushers 286 are spaced from one another on the main conveyor chains 282 and 284. The crank arm 306 rotates through one revolution per pan and is connected to the slider 308. The crank arm is rotated at a higher rate of speed than the advance chain circuit is being driven. Hence, as the crank arm rotates it will cause the slider to contact a projecting chain attachment 318 and drive the advance chain circuit through a greater distance for the same period of time. When the slider pushes the advance chain, this will override the overrunning clutch and hence drive the driven sprockets 288 at a rate of seven pitches in one-sixth the time. As the slider completes its movement, the overrunning clutch takes over again and starts driving the pan conveyor at its lower speed.

Again, in the specific example given, let it be assumed that the sprockets 288 are being rotated at a rate of 34 pans per minute. The crank arm would be rotating at a rate of 40 pans per minute. The crank arm is directly connected through link 307 to the slider mechanism. The advance sprocket 294 is driving the chain 316. The source of drive through shaft 302 is driving the crank arm 306.

It is readily apparent that the crank arm 306 which is driving the slider 308 will go at a faster rate of speed and catch up to the chain attachment 318 on the advance chain 316 and advance it to the correct distance within the given amount of time. The amount it advances is the seven pitches on the 24-tooth pan conveyor head sprockets 288 and 294 or the 60° of movement which is required in the one-sixth of the time. As the sprockets 288 complete the seven-pitch movement, the sprockets will have gone through one complete revolution which represents one complete pan movement. The one complete pan movement includes a movement of 17 pitches which occurs in five-sixths of the time and seven pitches in one-sixth of the time which is equal to 24 pitches or one complete pan movement. After the slider has advanced the advance chain circuit, it now starts its return stroke. The pivot finger 320 which pushes the chain attachment. will now fall out of the way of the next chain attachment 318 on the advance chain circuit and the cycle will just continue to repeat. The pan conveyor operates on the same principle irrespective of the number of cuts deposited per pan.

The pans 222 are moved by pushers 286 along the main pan conveyor 280. The pans are supported on a sheet metal bed 340 which is provided along the entire length of conveyor 280. A trapdoor 342 in the bed 340 is provided beneath the cutting blades 132 and 134. The trapdoor 342 will close when the presence of a pan 222 is sensed by any suitable conventional sensing means. An optical sensing device may be utilized.

The pneumatic or hydraulic cylinder 344 is provided to maintain the trapdoor open if no pan 222 is present in the cutting zone 130. Hence, cut gobs will fall through the opening in the bed 340 into an easily removable waste receptacle 346 when no pan is present in the cutting zone.

The trapdoor 342 provides support for the pans and prevents the pans 222 from jumping as cut gobs fall into pans.

Chain 328 drives sprocket 326 and shaft 349. The rate of rotation of shaft 349 is several times that of shaft 302 because of the difference in size of the sprockets 326 and 298. A pulley 350 is mounted on shaft 349 and adapted to rotate therewith. An idler pulley 352 is mounted on shaft 325. A belt 354 extends around pulleys 350 and 352. The belt 354 is driven at a rate substantially greater than the rate of movement of the pan conveyor. Hence, as the pans 222 exit from the pan conveyor substantial spaces are provided between the pans.

The belt 354 may deliver the filled pans to a further conveyor which may convey the spaced filled pans to a weight checking device from which they may be sent to ovens.

OPERATION

In view of the above description, a detailed explanation of the operation of the machine is not deemed necessary. The slab or rolls of raw dough are fed to the conveyor 20. A conveniently located selector switch may be utilized to determine the number of cuts per pan. The speed of the blades 132 and 134 will depend upon the number of cuts desired in each pan. The selector switch will determine which of the clutches associated with shaft 176 will be energized. The conveyor 20 will be in an extended or retracted position depending upon whether a flat slab of raw dough or rolls of raw dough are fed to the conveyor, respectively.

Pans 222 are dispensed from the conventional pan hopper 220 to an intermediate conveyor belt 224 and thence to the main pan conveyor 280. While on the main pan conveyor 280, the pans are supported by bed 340. When the presence of a pan is sensed, the trapdoor 342 will be closed thus providing support for the pans as the cut gobs fall therein. The rolls will be delivered to the cutting zone 130 at a predetermined rate. The pans are moved along the pan conveyor 280. Rapid movement of the pans is provided to accommodate the movement between the pans. The rapid movement is provided by the intercooperation of the advance sprocket 294, advance chain circuit 316 and the overrunning clutch 292.

When rolls rather than a single sheet of raw dough are fed to the cutting zone 130, the lucite guide rollers 80 and 82 prevent unwanted movement of the rolls as the cutting blades 132 and 134 sever gobs from the rolls. The lucite rollers are driven to facilitate constant feed of the rolls at a predetermined rate to the cutting zone 130. It will be noted that the knives 132 and 134 are shaped so that when rolls are cut, the center core thereof, is the last portion to be cut. As a result thereof, the gobs will fall straight down into the pans and thereby provide uniform rows.

Pans which have been filled are then ready for checking and topping with any sweet goods which may be desired. Thereafter, the pans may be conveyed to a weight checking device from which they will be sent to ovens.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for automatically cutting and depositing material into pans comprising a conveyor for delivering material to a cutting zone, cutting means in said cutting zone for severing gobs from said material, means for continuously operating said cutting means, a pan conveyor below the level of said cutting means for supporting pans into which the gobs may fall, means for continuously moving said pan conveyor, means for varying the speed of movement of said pan conveyor with respect to the cutting means to accommodate movement between pans, and a hopper for feeding pans to the pan conveyor.

2. Apparatus as set forth in claim 1 including selection means for varying the speed of said cutting means to accommodate varying numbers of gobs per pan, said cutting means including reciprocating knife blades.

3. Apparatus as set forth in claim 1 including driven guide rollers to facilitate movement of the material to the cutting zone.

4. Apparatus as set forth in claim 1 including a bed of sheet metal supported below the upper run of the pan conveyor, said bed providing support for pans as they move along the pan conveyor.

5. Apparatus as set forth in claim 4 including a trapdoor in said bed immediately below the cutting zone, said trapdoor being open when there is no pan in the cutting zone to permit cut gobs to fall into a waste receptacle.

6. Apparatus as set forth in claim 1 wherein said material conveyor is extensible, guide rollers movable into and out of operative position depending upon the material to be cut, said guide rollers being movable to inoperative position when said conveyor is extended.

7. Apparatus as set forth in claim 1 wherein said cutting means includes reciprocating knife blades, each of said knives including a V-shaped cutting edge in plan view, the knives being disposed one above the other with the cutting edges at their terminal ends so that the last portion of the material to be cut is the center core thereof.

8. Apparatus for automatically cutting and depositing raw dough into pans comprising a conveyor for delivering a continuous length of raw dough to a cutting zone, reciprocating cutting blades in said cutting zone for severing gobs from said raw dough, means for continuously operating said cutting blades, a pan conveyor below the level of said cutting blades for supporting pans into which the gobs may fall, means for continuously moving said pan conveyor, means for varying the speed of movement of said pan conveyor to accommodate movement between pans on said conveyor, a hopper for feeding pans to the pan conveyor, and means for varying the speed of said cutting blades to accommodate varying numbers of gobs per pan.

9. Apparatus as set forth in claim 8 including driven lucite guide rollers to facilitate movement of the raw dough to the cutting zone, and a sheet metal bed supported below the upper run of the pan conveyor, said bed providing support for pans as they move along the pan conveyor.

10. Apparatus as set forth in claim 9 including a trapdoor in said bed below the cutting zone, means for opening said trapdoor when there is no pan in the cutting zone to permit cut gobs to fall into a waste receptacle.

11. Apparatus as set forth in claim 9 wherein said raw dough conveyor is extensible, guide rollers movable into and out of operative position depending upon the shape of the raw dough to be cut, said guide rollers being movable to inoperative position when said conveyor is extended, each of said knives having a V-shaped edge in plan view, the continuous length of raw dough being in the shape of a roll, the knives being disposed one above the other with the cutting edges at their terminal ends so that the last portion to be cut is the center core thereof.

12. Apparatus as set forth in claim 11 wherein said guide rollers are driven in opposite directions to facilitate the feed of rolls of raw dough to the cutting zone.

13. Apparatus including a pan conveyor for automatic material handling machinery, drive means for driving a crank arm with a first sprocket, said first sprocket being drivingly interconnected with a second sprocket, said second sprocket driving through an overrunning clutch to drive said pan conveyor and an advance sprocket, an advance chain circuit extending around said advance sprocket, the chain of said advance chain circuit having extensions thereon, said crank arm having a slider operatively associated therewith, said slider engaged in one of said extensions to speed up said advance chain circuit and cause said advance sprocket to drive said pan conveyor at the greater speed than said second sprocket drives said pan conveyor, said overrunning clutch permitting said pan conveyor to be driven at a greater speed.

14. Apparatus as set forth in claim 13 wherein said pan conveyor has pushers thereon, said pushers being adapted to push a pan through said material handling machinery, the distance between the pushers on said pan conveyor being the same as the distance between the extension on said chain.

15. Apparatus for automatically cutting and depositing material into pans comprising:
first conveyor means for receiving and delivering material to a cutting zone;
cutting means in the cutting zone for severing gobs from said material, the cutting means operating at a predetermined constant rate;
second conveyor means for conveying essentially equidistantly spaced pans at a predetermined constant rate below the cutting means;
the respective predetermined constant rates of the cutting means and second conveyor means being related to permit the severed gobs to fall into the pans;
and means for periodically advancing the second conveyor means to reconcile the distance between pans to the predetermined constant rate of the cutting means.

16. Apparatus as set forth in claim 15, and further comprising means for changing the predetermined constant rate of the cutting means.

17. Apparatus for depositing individual pieces of food material into pans, comprising:
first means for receiving the food material pieces and for causing the movement thereof to a depositing area;
second means for conveying spaced pans through the depositing area;
the operation of the first and second means being related to permit the deposit of food material pieces into the pan;
support means underlying the second means for providing support to the pans as they are moved through the depositing area, the support means having an opening therein disposed in the depositing area;
closure means for normally closing the opening in the support means, the closure means movable to a position whereby the opening is open to permit food material pieces to fall therethrough;
means for sensing the presence of a pan in the depositing area;
and means responsive to the sensing means for moving the closure means to the open position when there is no pan in the depositing area.

18. The apparatus as defined by claim 1, wherein the closure means comprises a door hingeably mounted on the support means.

19. The apparatus as defined by claim 17, wherein the support means comprises a sheet metal bed.

20. The apparatus as defined by claim 17, wherein the food material is baking dough, and the first means comprises:
a conveyor for carrying whole dough;
and cutting means for receiving the dough from the conveyor and for severing pieces of dough, the cutting means disposed above the depositing area to permit the severed dough pieces to fall into the pans.

21. The apparatus as defined in claim 17, and further comprising a waste receptacle disposed beneath the opening to receive food material pieces when the closure means is in the open position.

22. The apparatus as defined by claim 17, wherein the pan sensing means comprises an optical sensing device.

23. The apparatus as define by claim 17, wherein the means for moving the closure means comprises a hydraulic cylinder carried by the support means and operably connected to the closure means.